Dec. 17, 1940. E. GOLDBERG 2,225,433
PHOTOGRAPHIC CAMERA FOR FLEXIBLE MATERIALS SENSITIVE TO LIGHT
Filed Oct. 18, 1937 2 Sheets-Sheet 1
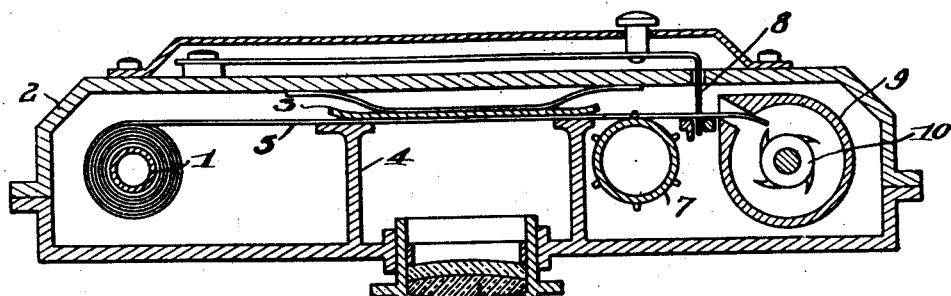
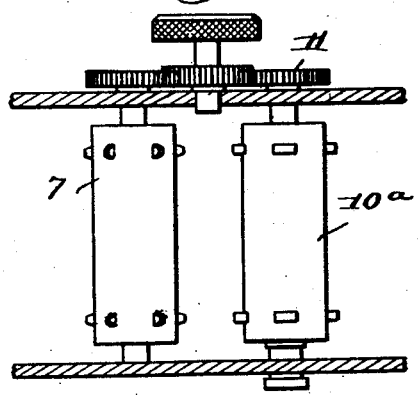 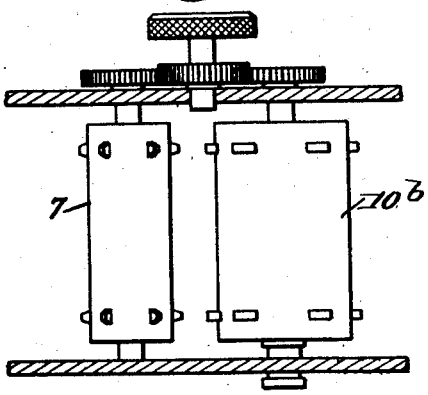
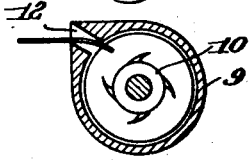
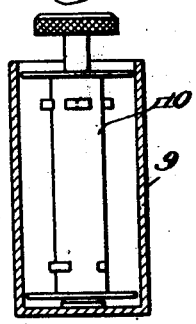 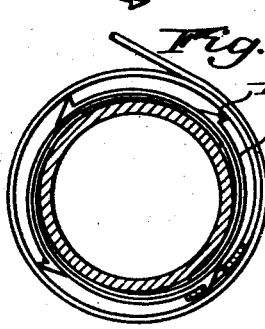 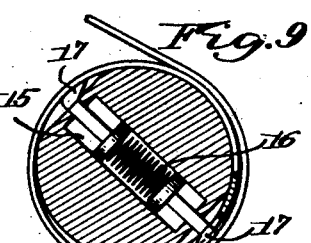
INVENTOR.
Emanuel Goldberg
BY
ATTORNEYS Dec. 17, 1940.  E. GOLDBERG  2,225,433
PHOTOGRAPHIC CAMERA FOR FLEXIBLE MATERIALS SENSITIVE TO LIGHT
Filed Oct. 18, 1937   2 Sheets-Sheet 2

INVENTOR.
Emanuel Goldberg
BY Newton M. Perruis
Donald H. Stewart
ATTORNEYS

Patented Dec. 17, 1940

2,225,433

UNITED STATES PATENT OFFICE 2,225,433

PHOTOGRAPHIC CAMERA FOR FLEXIBLE MATERIALS SENSITIVE TO LIGHT

Emanuel Goldberg, Paris, France

Application October 18, 1937, Serial No. 169,710
In Luxemburg October 23, 1936

8 Claims. (Cl. 95—31)

The object of the present invention is a photographic camera for flexible material sensitive to light. The apparatuses of this kind now in the trade are provided in such a way that a strip of sensitized material (film, paper) is wound from one roller upon another. In this construction the entire strip on the feeding roller must be used before it is possible to proceed with the development of the images. A great inconvenience results from the fact that the length of the strip on the feeding roller must be held as large as possible in order to avoid the necessity of frequently changing the rollers, and on the other hand it is a great disadvantage that it is often necessary to wait a long time before the images can be made ready for use.

This condition is particularly prejudicial for the preparation of the scientific and technical photographs, where often several proofs of the images are to be taken off before being able to proceed with the preparation of a series of pictures. In the known apparatuses, for instance, of the Leica or Contax types, this however is not easily possible.

According to the invention, the camera is provided with a cutting device so that the exposed portion of the strip may be severed from the unexposed portion. In addition, a special form of take-up box is employed so that the strip entering into the box is automatically caught by a core rotatably mounted in the box.

Another form of realisation of the invention consists in such a structure of the take-up box that the various windings of the rolled up exposed film are suitably spaced. The box with the film contained therein may then be used directly as a development box, in that it may be filled with a developing solution and later with the fixing bath. This arrangement permits the developing and fixing of the film strip without the use of a darkroom.

Two forms of realisation of the object of the invention will be now described in reference to the accompanying drawings in which:

Fig. 1 is a longitudinal sectional view through a photographic camera, showing the relation thereto of a film winding box or container constructed in accordance with one embodiment of the invention;

Fig. 2 is a horizontal sectional view through a portion of a camera illustrated in Fig. 1, showing one form of film wind-up core and a mechanism for driving the core and the film feeding sprocket or drum;

Fig. 3 is a view similar to Fig. 2, showing another form of film wind-up core, and a mechanism by which the core and the film feeding sprocket are driven;

Fig. 4 is a transverse sectional view of one form of film box and wind-up core;

Fig. 5 is a longitudinal sectional view of the box and core illustrated in Fig. 4;

Fig. 6 is a transverse sectional view of another form of wind-up core;

Fig. 7 is a view similar to Fig. 6, but on a larger scale than the latter, showing the position of the film engaging hooks after several convolutions of the film strip have been wound onto the core;

Fig. 8 is a view similar to Fig. 6, showing another form of wind-up core;

Fig. 9 is a view similar to Fig. 8, but on a larger scale than the latter, showing the position of the film engaging hooks after several convolutions of the film strip have been wound on the core;

Figure 14:
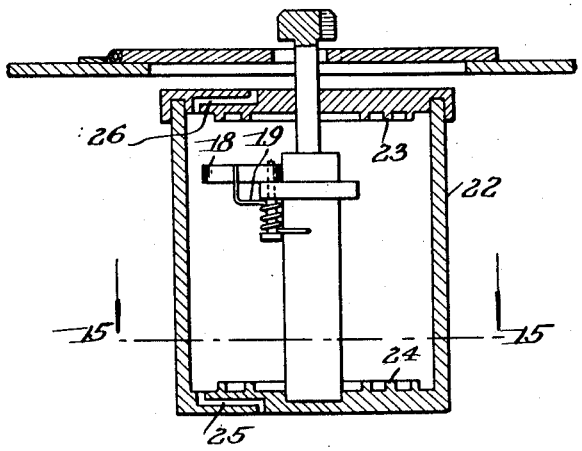
Figure 15:
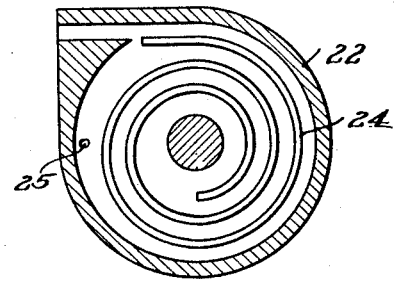

Fig. 14 is a longitudinal sectional view through a second form of the invention showing a film box, in which the opposite ends of the box are arranged so that the adjacent convolutions of the film strip are maintained in spaced relation so that the box may be used as a developing container or tank; and Fig. 15 is a transverse sectional view of the film box illustrated in Fig. 14, and taken substantially on line 15—15 of Fig. 14.

Fig. 1 is a schematic view of a photographic camera for perforated film, in which 1 is a feeding roller with perforated unexposed film, 2 a removable cover on which is elastically fixed a plate 3, 4 an image frame on which is positioned under pressure the plate 3 and which forms a narrow passage for the film 5, 6 is the photographic objective, 7 a toothed drum, which after exposure of the film 5 drives forward equal portions of the film, 8 is a cutting device for the separation of the exposed portion of the film, 9 shows the take-up box in the empty state and into which the film is just beginning to enter.

The cutting device as well as the take-up box and the film core may be constructed in different ways.

The core 10 of the box, Figs. 1, 4, and 5 is shaped so as to catch automatically the perforated film strip as soon as it enters the box, and this may be facilitated by offsetting the hooks, as shown in Fig. 5.

This automatic engagement of the film end forwarded into the box is made possible, according to the invention, because of the fact that one or several hooks which are provided on the core 10 have a higher rate of lineal speed than the entering film. The hooks slide along the entering perforated film until they engage with a hole of the same. From this moment forward the winding of the film is operated exactly in the usual manner.

The higher lineal speed rate of the core periphery in relation to the film strip is obtained in different ways. Thus, for instance, if the diameter of the drum 7 and core 10a are equal the core axis 11, Fig. 2, can be given a higher angular speed than the axis of the toothed drum 7, which controls the forwarding motion of the perforated film. However, according to Fig. 3, the two axes may also have the same angular speed, but the core 10b has then a greater diameter than the drum 7. In both cases, it is however, necessary to take care that the film end entering into the box 9, Figs. 1 and 4, does not run somewhat tangentially to the outer surface of the box, but rather in a radial direction toward the core 10, and this independently of the natural bending of the free end of the film. This result may be secured by a suitable shape of the film guide 12.

Where the arrangement of a core with a large diameter shows difficulties owing to the want of space for the wound up film, and when, on the other hand, the speed rate of the toothed drum is already fixed and cannot be altered, a special form of core may be used. This core has originally, that is until the engagement of the film, a large effective diameter, but later, that is when the box is beginning to become progressively filled with the exposed film, this effective diameter is automatically reduced so as to give room for a greater film length. This arrangement gives, furthermore, the advantage that the film is caught by the core adjacent the periphery of the box so that it is not necessary with this arrangement to direct the film radially toward the center of the box 9, as shown in Figs. 1 and 4. Thus the hooks of a core constructed in that way move with a constant angular speed and have a lineal speed which may be automatically altered within wide limits.

One of the forms of realisation of such a core shows, according to Fig. 6, hooks 13 fixed on leaf springs 14 and pressed outwardly somewhat radially under the influence of same. In the embodiment shown in Figs. 8 and 9, the hooks 17 are arranged in radial guides 15, and are urged outwardly by coil spring 16, Figs. 8 and 9. Prior to the time that the film is engaged by the core hooks 13 or 17 the lineal speed of the hooks is higher than that of the toothed drum 7. When the film now enters the box, it is, after a short time, reached by a hook which comes into engagement in one of the first perforations. The radially movable hooks are then pressed inwardly, that is towards the core center, by the tightening windings of the film, as shown in Figs. 7 and 9 so that the effective diameter of the core is now substantially reduced with the result that a sufficient free space is made within the box for the film which is being continually fed thereinto.

Figure 10:
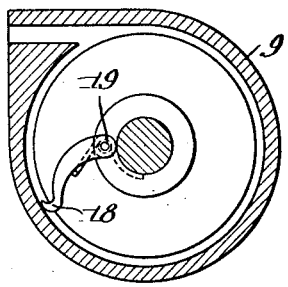
Fig. 10 is a transverse sectional view through another form of film box and wind-up core.

The number of the hooks may also be reduced to one only 18, Fig. 10, fixed on the core so as to be projected outwardly therefrom under the influence of a spring 19. It is necessary to have this hook in such a position as to engage one of the first few holes in the film being fed into the box 9. Owing to its higher speed, this hook 18 will move faster than the film until the hook, under the action of the spring 19, engages the hole in the film.

The folding of the hook or hooks is furthermore controlled, apart from the above mentioned pressure of the windings of the film, by the traction of the strip, since as soon as a hook has engaged the film, its speed is decreased to the lineal rate of the film. Thus is braked the motion of the hook which puts in action the friction coupling always existing between the core and its driving means. As such friction couplings are common and well known to those in the art, a detailed discussion is not deemed necessary. Care must be taken that the engagement of the hook or hooks with the film occurs at the right moment and at a point adjacent one of the first film perforations. When several hooks are used, the hooks are so spaced that one will always be near the take-up opening in the box 9 so that no special provision need be made for accurately positioning the core in the box. However, when only a single hook core, as shown in Fig. 10, is used special means must be provided for accurately positioning the core in the box 9.

In order that this position of the core in the empty box may be secured under any circumstances, special means are provided according to the invention. Thus, for instance, the box 9 cannot be introduced into the camera unless the core is in the prescribed position. In the use of boxes in which the entry opening of the film is opened from outside of the camera when the camera is closed, which constructions are old and well known to those in the art the device for opening the box is preferably shaped in such a way that it will come into operation only when the core is in defined position (rest position).

Figure 12:
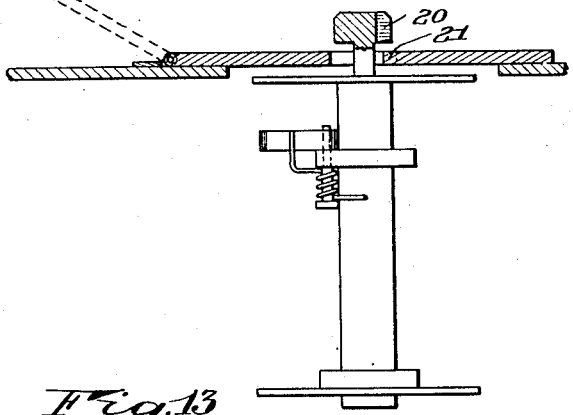
Fig. 12 is a horizontal sectional view of a portion of the camera illustrated in Fig. 1, showing the arrangement for securing the proper positioning of the wind-up core illustrated in Figs. 10 and 11.
Figure 11:
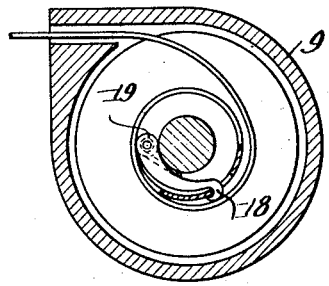
Fig. 11 is a view similar to Fig. 10, showing the position of the single film-engaging hook after a convolution of film strip has been wound on the core.
Figure 13:
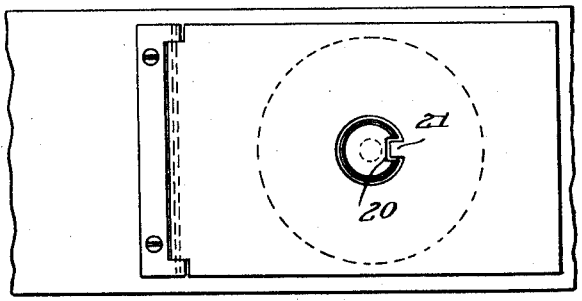
Fig. 13 is a plan view of the mechanism illustrated in Fig. 12.

For this purpose, the core may be provided, for instance, with a notch 20, Fig. 12, which, when the core is in correct position, registers with a similar notch 21 on a hinged door (see Figs. 12 and 13), through which the box 9 may be inserted or removed from the camera. When, however, the core is improperly positioned, the notch 20 thereon is out of registry with the notch 21 in the door and the latter cannot be closed.

A modified form of the box is adapted to wind up the film so as to avoid mutual friction of the different film convolutions or windings. By a suitable design of such a box, the same may be used both as a winding apparatus and as a developing tank, so that the negatives may be developed without the use of a darkroom.

For this purpose are arranged on the end faces inside the box 22 spirals 23 and 24, Figs. 14 and 15, made of a suitable material (for instance, Bakelite or stainless steel) which maintain the various windings separated one from the others. The labyrinth shaped openings 25 and 26 allow the inlet of the solution for the development and the outlet of the air.

It is to be understood that any of the above-described cores may also be used in connection with the developing type box shown in Figs. 14 and 15.

Having now described this invention and in which manner same is to be performed, what I claim is:

1. In a roll film camera, the combination with a cylindrical film receiving box positioned in one end of said camera and formed with a slot through which exposed film may pass, means for feeding the film through the camera and said slot, of a variable-diameter film winding core positioned within said box and formed with resiliently mounted members arranged adjacent the periphery of said box and adapted to automatically engage said film as the latter enters said box to wind said film onto said core.

2. In a roll film camera, the combination with a cylindrical film receiving box positioned in one end of said camera and formed with a slot through which exposed film may pass, means for feeding the film through the camera and said slot, of a film-winding core positioned within said box, said core when empty having a normal diameter substantially equal to the internal diameter of said box but automatically decreasing in diameter when film is attached thereto, and film engaging members carried by said core and adapted to engage said film as it enters said box to wind said film on said core.

3. In a roll film camera, the combination with a cylindrical film receiving box positioned in one end of said camera and formed with a slot through which exposed film may pass, means for feeding the film through the camera and said slot, of a film winding core positioned within said box, a resilient member secured to said core and extending outwardly therefrom, the free end of said member being substantially in engagement with the inner surface of said box when said core is empty, said member automatically folding against said core when film is attached thereto, and a film engaging hook carried by said free end.

4. In a roll film camera, the combination with a cylindrical film receiving box positioned in one end of said camera and formed with a slot through which exposed film may pass, means for feeding the film through the camera and said slot, of a film winding core positioned within said box, a leaf spring having one end thereof secured to said core and having the free end thereof normally spaced from said core, and a film engaging hook carried by said free end and adapted to engage said film as it enters said box, said engagement automatically decreasing the radial distance between said core and said free end.

5. In a roll film camera, the combination with a cylindrical film receiving box positioned in one end of said camera and formed with a slot through which exposed film may pass, means for feeding said film through said camera and said slot, of a film winding core positioned within said box, film engaging members movably mounted on said core and yieldable urged outwardly therefrom to automatically engage said film as the latter enters said box, said core with its engaging members being when empty of a larger diameter than said feeding means, and means for rotating said core and said feeding means at the same angular speed to thus move said members relative to said strip prior to the engagement therewith, such engagement serving to move said members toward said core to thus automatically reduce the speed of said members to that of said strip and to simultaneously reduce the effective core diameter.

6. In a roll film camera, the combination with a cylindrical film receiving box positioned in one end of said camera and formed with a slot through which exposed film may pass, means for feeding the film through the camera and said slot, of a film winding core positioned within said box, means on said box for arranging the film windings in spaced relation about said core, and a film engaging member resiliently mounted on said core and extending outwardly therefrom to engage automatically said film as the latter enters said box to positively feed said film along said spacing means, said member being automatically moved toward said core when said strip is wound thereon.

7. In a roll film camera, the combination with a cylindrical film receiving box positioned in one end of said camera and formed with a slot through which exposed film may pass, means for feeding the film through the camera and said slot, of a film winding core positioned within said box, spiral grooves arranged on the opposite ends of said box to position the film windings therein in spaced relation about said core, a film engaging member movably mounted on said core and extending outwardly therefrom to engage automatically said film as the latter enters said box, and means for moving said member relative to said film prior to the engagement thereof, said engaging serving to move said member toward said core to reduce automatically both the lineal speed and the effective diameter of said core.

8. A camera comprising a casing, means to rotatively and removably support a roll of films at one end of the camera means to guide the film to the other end of the camera, a cartridge, means to removably support the cartridge in the receiving end of the camera, a spool for the exposed film, means to rotatively and removably support the spool in the cartridge, the cartridge being provided with a slot in the wall for receiving the film for the spool, means to guide the film into the slot, a knife movably supported in the casing and adapted to be manually operated for cutting the film in two, and hook means in the spool for engaging the end of the film.

EMANUEL GOLDBERG.